United States Patent
Zhou et al.

(10) Patent No.: US 11,098,240 B2
(45) Date of Patent: Aug. 24, 2021

(54) DOWNHOLE FLUIDS CONTAINING CYCLIC ORTHOESTERS AND BRINE AND METHODS FOR USING THE SAME

(71) Applicant: HALLIBURTON ENERGY SERVICES, INC., Houston, TX (US)

(72) Inventors: Hui Zhou, The Woodlands, TX (US); William W. Shumway, Springs, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/475,593

(22) PCT Filed: Feb. 20, 2018

(86) PCT No.: PCT/US2018/018858
§ 371 (c)(1),
(2) Date: Jul. 2, 2019

(87) PCT Pub. No.: WO2018/160396
PCT Pub. Date: Sep. 7, 2018

(65) Prior Publication Data
US 2020/0032135 A1    Jan. 30, 2020

Related U.S. Application Data

(60) Provisional application No. 62/466,564, filed on Mar. 3, 2017.

(51) Int. Cl.
*E21B 43/28*    (2006.01)
*C09K 8/72*    (2006.01)
(Continued)

(52) U.S. Cl.
CPC ................ *C09K 8/72* (2013.01); *E21B 43/25* (2013.01); *E21B 43/26* (2013.01); *E21B 43/28* (2013.01)

(58) Field of Classification Search
None
See application file for complete search history.

(56) References Cited

U.S. PATENT DOCUMENTS 7,140,438 B2   11/2006   Frost et al.
7,168,489 B2   1/2007    Frost et al.
(Continued)

FOREIGN PATENT DOCUMENTS

WO    2009138733 A1    11/2009
WO    2016108877 A1    7/2016

OTHER PUBLICATIONS

Deslongchmps, P., et al., The Products of Hydrolysis of Cyclic Orthoesters as a Function of pH and the theory of Stereoelectronic Control., Canadian Journal of Chemistry, 1985, vol. 63, No. 9, pp. 2485-2492.
(Continued)

*Primary Examiner* — Andrew Sue-Ako
(74) *Attorney, Agent, or Firm* — Chamberlain Hrdlicka

(57) ABSTRACT

Compositions and methods for treating a downhole environment are provided. The method includes introducing a treatment solution containing a cyclic orthoester and brine into a wellbore within the downhole environment and hydrolyzing the cyclic orthoester to produce an acid within the downhole environment.

19 Claims, 1 Drawing Sheet

(51) Int. Cl.
*E21B 43/26* (2006.01)
*E21B 43/25* (2006.01)

(56) References Cited

U.S. PATENT DOCUMENTS

| | | | |
|---|---|---|---|
| 7,497,278 | B2 | 3/2009 | Schriener et al. |
| 2007/0066493 | A1* | 3/2007 | Funkhouser ............ C09K 8/68 507/261 |
| 2009/0084554 | A1 | 4/2009 | Williamson et al. |
| 2014/0069643 | A1* | 3/2014 | Ogle ..................... C09K 8/72 166/278 |
| 2015/0240144 | A1* | 8/2015 | Kumar ................. C10M 107/42 508/211 |
| 2016/0304765 | A1* | 10/2016 | Kadam ................. E21B 21/003 |

OTHER PUBLICATIONS

The International Search Report and Written Opinion dated Jun. 19, 2018 for PCT Application No. PCT/US2018/018858 filed Feb. 20, 2018 (11 pages).

* cited by examiner

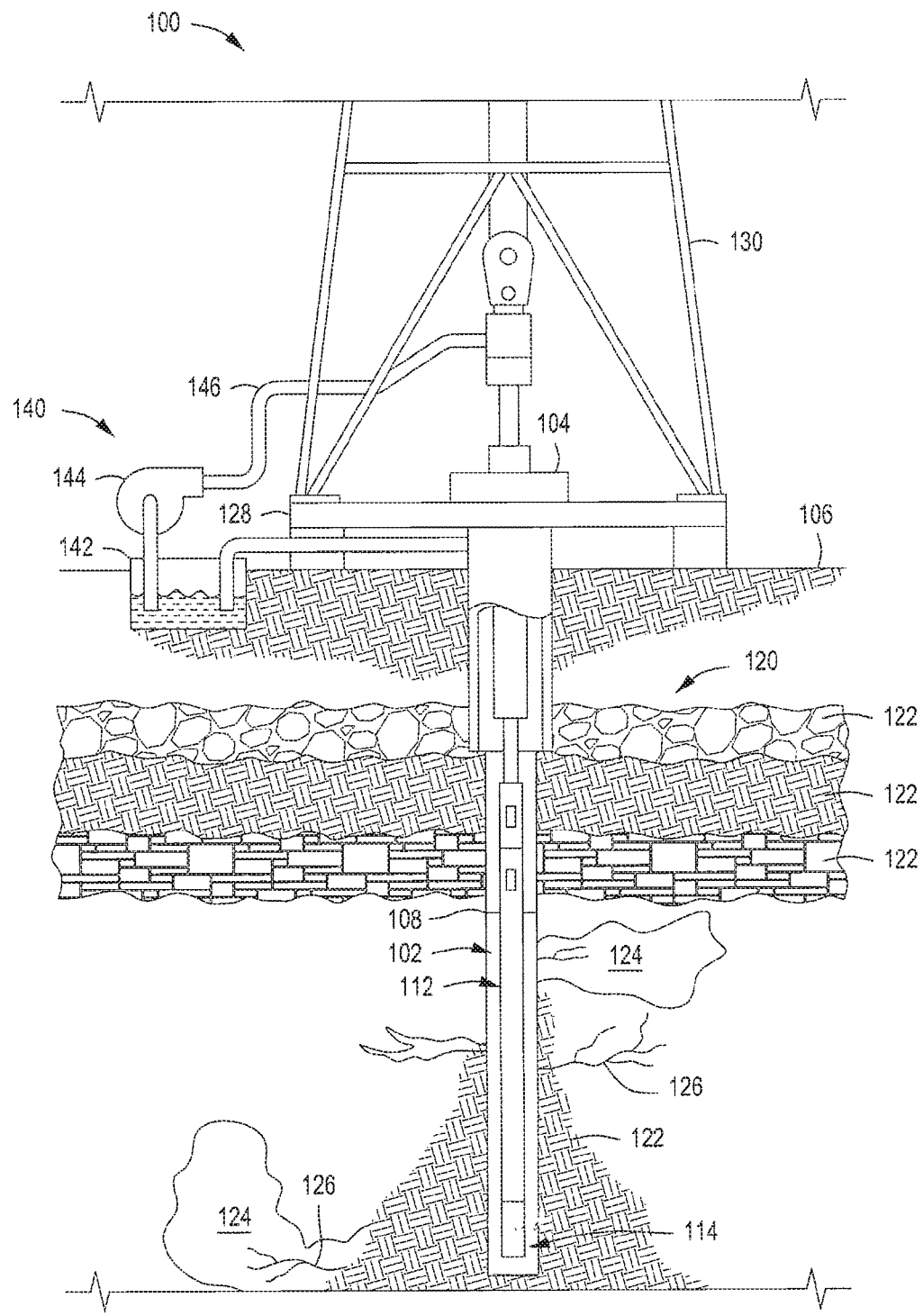

DOWNHOLE FLUIDS CONTAINING CYCLIC ORTHOESTERS AND BRINE AND METHODS FOR USING THE SAME

BACKGROUND

This section is intended to provide relevant background information to facilitate a better understanding of the various aspects of the described embodiments. Accordingly, it should be understood that these statements are to be read in this light and not as admissions of prior art.

In oil and gas production, an acidizing process is a process for dissolving materials within a formation to improve production. Acidizing fluids have been used to increase the productivity of oil and gas from calcareous formations by effecting the removal of reactive materials from naturally occurring fractures and pore spaces in the formations whereby the sizes thereof are increased. Acidizing fluids also have been used to create new fractures in formations with the acid acting to etch the fractures so that they remain open and have a high flow capacity.

During the acidizing process, an acidizing fluid starts being consumed as the fluid enters the formation, therefore the fluid can only reach a particular distance before being spent in the formation. While producing new fractures in the formation, if the acidizing fluid is pumped under pressure further into the formation after the fluid has become spent, the fluid may extend fractures in the formation, but the acid-etching fluid may not increase the flow capacities of the extended fractures. Strong mineral acids, such as concentrated hydrochloric acid, are used to fracture limestone reservoirs while improving production from the rock. The mineral acid dissolves carbonate rock from the walls of the fracture thus etching a pathway through which the produced oil or gas can flow back to the production string. However, the mineral acid is spent at the surface of the carbonate rock, and thus it is difficult for spent acid to affect the dimensions of the pore throats that are naturally present in the rock, therefore the permeability of the limestone in the near-wellbore/near-fracture zone is not improved.

Therefore, there is a need for an improved acidizing fluid and a method for treating downhole environments with the acidizing fluid to improve production.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 1 is a schematic view of a well system containing a delivery system that is used to introduce a treatment solution into a downhole environment, according to one or more embodiments.

DETAILED DESCRIPTION

Embodiments provide downhole treatment solutions containing cyclic orthoesters and brine and methods for treating downhole environments with the treatment solutions. FIG. 1 depicts a schematic view of a well system 100 that utilizes the treatment solutions and methods described and discussed herein, according to one or more embodiments. The well system 100 is located in and around a wellbore 102 and on a ground surface 106. The wellbore 102 is formed within a subterranean region 120 beneath the ground surface 106. The wellbore 102 contains one or more fluids 108, such as drilling fluid, production fluids, fracturing fluids, other downhole or annular fluids, or any combination thereof.

The subterranean region 120 includes all or part of one or more subsurface layers 122, one or more subterranean formations 124, subterranean zones, and/or other earth formations. The subterranean region 120 shown in FIG. 1, for example, includes multiple subsurface layers 122 and subterranean formations 124. Fractures 126, and other types of cracks, are formed throughout the subsurface layers 122 and the subterranean formations 124. The subsurface layers 122 can include sedimentary layers, rock layers, sand layers, or any combination thereof and other types of subsurface layers. One or more of the subsurface layers 122 can contain fluids, such as brine, oil, gas, or combinations thereof. The wellbore 102 penetrates and extends through the subsurface layers 122. Although the wellbore 102 shown in FIG. 1 is a vertical wellbore, the well system 100 can also be implemented in other wellbore orientations. For example, the well system 100 may be adapted for horizontal wellbores, slant wellbores, curved wellbores, vertical wellbores, or any combination thereof.

The well system 100 includes a platform 128 located above the surface 106 equipped with a derrick 130 that supports a casing 112 extending through a wellhead 104 and into the wellbore 102. The casing 112 can be or include, but is not limited to, one or more pipes (e.g., jointed drill pipe, hard wired drill pipe, or other deployment hardware), strings, tubulars, coiled tubings, slicklines, wireline cables, tractors, a kelly, a bottom hole assembly (BHA), other conveyance devices, or any combination thereof. The BHA on the casing 112 can include, but is not limited to, one or more of valves 114, drill collars, drill bits, sensors, logging tools, other components, and/or any combination thereof. For example, the casing 112 includes one or more valves 114 at the downhole end. The valve 114 can be or include a control valve, a check valve, or any other type of valve for controlling fluid flow therethrough.

The well system 100 includes a delivery system 140 that is used to deliver or otherwise introduce one or more treatment solutions containing cyclic orthoesters and brine into a downhole environment, such as the wellbore 102, the subterranean formation 124, and the fractures 126, according to one or more embodiments. The delivery system 140 includes one or more containers 142, one or more pumps 144, and one or more pipes 146. The container 142 can contain one or more treatment solutions that can be produced, stirred, mixed, stored, delivered, or any combination thereof within the container 142. For example, the treatment solution can include one or more cyclic orthoesters, one or more brines, and/or one or more organic solvents.

The cyclic orthoesters, the brine, and/or the organic solvent are combined to produce the treatment solution prior to placing the treatment solution into the subterranean formation. For example, the treatment solution is produced offsite of the delivery system 140 and subsequently introduced or otherwise added into the container 142. In other examples, one or more components of the treatment solution are mixed or otherwise combined to produce the treatment solution onsite of the delivery system 140, such as in the container 142. Thereafter, the treatment solution is stored until ready to be used. The container 142 can be, but is not limited to, one or more tanks, vessels, columns, or reactors and can include one or more mixing devices and one or more heat control devices.

The treatment solution is conveyed or otherwise transported from the container 142 via pipe 146 to the wellhead 104, where the treatment solution is introduced into the casing 112. The casing 112 extends from the wellhead 104 into one or more boreholes or wellbores 102 and the subterranean formation 124 each formed in the subterranean region 120. Although the wellbore 102 shown in FIG. 1 is a vertical wellbore, the treatment solution can also be used in wellbore having other orientations. For example, the treatment solution can be introduced into horizontal wellbores, slant wellbores, curved wellbores, vertical wellbores, or any combination thereof. It should be noted that while FIG. 1 generally depicts a land-based system, it is to be recognized that like systems can be operated in subsea locations as well.

The pump 144 is coupled to and in fluid communication with the container 142 and the pipe 146, as shown in FIG. 1. The pump 144 transports the treatment solution from the container 142, through the pipe 146 and the casing 112, and into the wellbore 102, the subterranean formation 124, and/or the fractures 126. The pump 144 can also be used to control the pressure within the wellbore 102, the subterranean formation 124, and other portions of the subterranean region 120.

The treatment solution is flowed into and contained within the subterranean formation 124. Upon being introduced, ejected, or otherwise exiting from the casing 112, the treatment solution subsequently penetrates into fractures 126, including cracks, holes, passageways, and other forms of porosity within the subterranean formation 124. The subterranean formation 124 can be or include, but is not limited to, one or more carbonate formations.

It is to be recognized that the delivery system 140 is merely exemplary in nature and various additional components can be present that have not necessarily been depicted in FIG. 1 in the interest of clarity. Non-limiting additional components that can be present include, but are not limited to, supply hoppers, mixing devices, valves, condensers, adapters, joints, gauges, sensors, pumps, compressors, pressure controllers, pressure sensors, flow rate controllers, flow rate sensors, temperature sensors, or temperature control devices.

Treatment Solution

In one or more embodiments, the treatment solution includes one or more acid precursors (e.g., cyclic orthoesters) and one or more brines or aqueous fluids containing salt. The treatment solution can also include one or more organic solvents that are used as a co-solvent for dissolving the acid precursor in the brine to produce the treatment solvent.

The treatment solution contains one or more acid precursors that generate in situ one or more organic acids in the downhole environment. The acid precursor is or includes one or more cyclic orthoesters. Once the treatment solution is flowed to or otherwise introduced to the predetermined location within the downhole environment, the cyclic orthoester is hydrolyzed to generate the organic acid. The acid is thus formed or otherwise produced from the cyclic orthoester via hydrolyzing the cyclic orthoester.

In one or more embodiments, the cyclic orthoester is one or more mono(cyclic orthoesters) that have at least one of the Formulas I, IIa, or IIb:

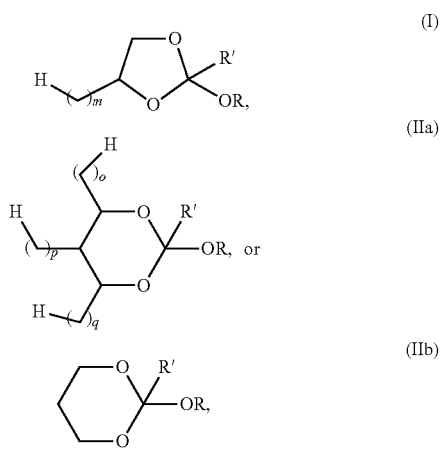

where R is a $C_1$-$C_{10}$ alkyl; R' is hydrogen or a $C_1$-$C_{10}$ alkyl; and each of m, o, p, and q is independently an integer in a range of 0 to 10, such as 0 to 5. In one or more examples, R is methyl, ethyl, or propyl; R' is hydrogen, methyl, or ethyl; and each of m, o, p, and q is independently an integer of 0, 1, or 2.

In some embodiments, the cyclic orthoester is one or more mono(cyclic orthoesters) that have the Formula III and/or one or more di(cyclic orthoesters) that have the Formula IV:

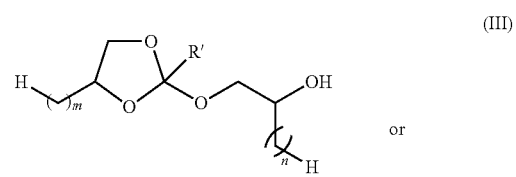

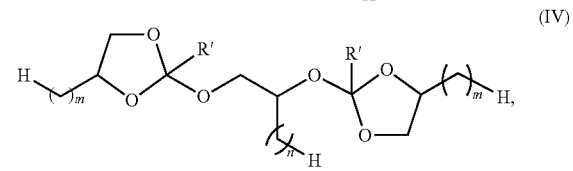

where R' is hydrogen or a $C_1$-$C_{10}$ alkyl; and each m and n is independently an integer in a range of 0 to 10, such as 0 to 5. In one or more examples, R' is hydrogen, methyl, or ethyl; and each m and n is independently an integer of 0, 1, or 2.

In one or more embodiments, the cyclic orthoester is one or more mono(cyclic orthoesters) that have the Formula Va and/or one or more di(cyclic orthoesters) that have the Formula VIa:

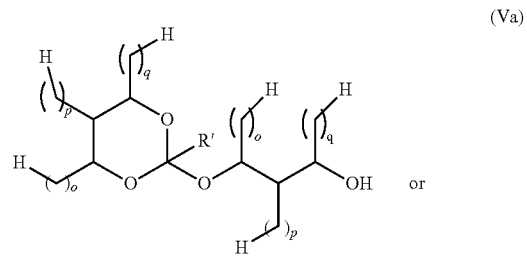

-continued

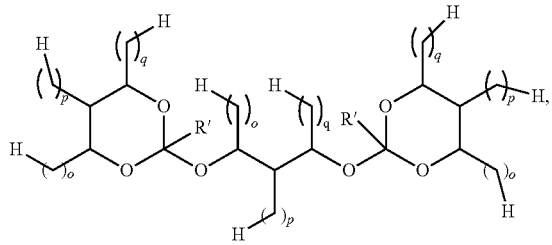
(VIa)

where R' is hydrogen or a $C_1$-$C_{10}$ alkyl; and each of o, p, and q is independently an integer in a range of 0 to 10, such as 0 to 5. In one or more examples, R' is hydrogen, methyl, or ethyl; and each o, p, and q is independently 0, 1, or 2.

In one or more embodiments, the cyclic orthoester is one or more mono(cyclic orthoesters) that have the Formula Vb and/or one or more di(cyclic orthoesters) that have the Formula VIb:

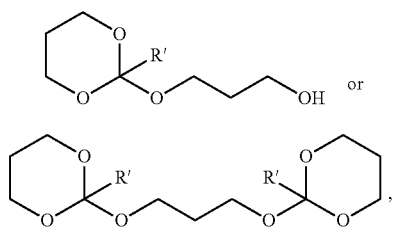
(Vb)

or (VIb)

where R' is hydrogen or a $C_1$-$C_{10}$ alkyl. In one or more examples, R' is hydrogen, methyl, or ethyl.

In some embodiments, the cyclic orthoester has the Formula VII:

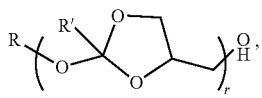
(VII)

where R is a $C_1$-$C_{10}$ alkyl; R' is hydrogen or a $C_1$-$C_{10}$ alkyl; and r is an integer in a range of 1 to about 20. In one or more examples, R is methyl, ethyl, or propyl; R' is hydrogen, methyl, or ethyl; and r is an integer in a range of 2 to 10.

In one or more embodiments, the treatment solution contains about 2 vol %, about 3 vol %, about 5 vol %, about 8 vol %, about 10 vol %, about 12 vol %, about 15 vol %, about 20 vol %, about 25 vol %, or about 30 vol % to about 35 vol %, about 40 vol %, about 45 vol %, about 50 vol %, about 60 vol %, about 70 vol %, or about 80 vol % of the cyclic orthoester. For example, the treatment solution contains about 2 vol % to about 80 vol %, about 5 vol % to about 80 vol %, about 5 vol % to about 70 vol %, about 5 vol % to about 60 vol %, about 5 vol % to about 50 vol %, about 5 vol % to about 40 vol %, about 5 vol % to about 30 vol %, about 5 vol % to about 25 vol %, about 5 vol % to about 20 vol %, about 5 vol % to about 15 vol %, about 10 vol % to about 80 vol %, about 10 vol % to about 70 vol %, about 10 vol % to about 60 vol %, about 10 vol % to about 50 vol %, about 10 vol % to about 40 vol %, about 10 vol % to about 30 vol %, about 10 vol % to about 25 vol %, about 10 vol % to about 20 vol %, or about 10 vol % to about 15 vol % of the cyclic orthoester.

The treatment solution also includes one or more brines. The treatment solution is an aqueous solution and can include one or more salts contained therein. Other aqueous fluids, such as drilling fluids, wellbore fluids, or brines, contain salts and can be combined with the treatment solution. The brine in the treatment solution can include, but is not limited to, fresh water, sea water, water containing organic and/or inorganic dissolved salts, liquids containing water-miscible organic compounds, solvents, or any combination thereof. For example, the brine can be formulated with mixtures of desired salts in fresh water. Salts dissolved in the brine can include, but are not limited to, alkali metal and/or alkaline earth halides, hydroxides, and/or carboxylates, for example.

The brine in the treatment solution can include, but is not limited to, one or more salts of sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. The salts can be monovalent, divalent, trivalent, or any combination thereof. Salts that can be incorporated in the treatment solution include any one or more of those contained in natural seawater or any other organic or inorganic dissolved salts. Additionally, brines used in the treatment solution can be natural or synthetic brines, with synthetic brines tending to be much simpler in constitution. Exemplary salts can be or include, but are not limited to, one or more of sodium chloride (NaCl), sodium bromide (NaBr), potassium chloride (KCl), potassium bromide (KBr), cesium chloride (CsCl), cesium bromide (CsBr), calcium chloride ($CaCl_2$), calcium bromide ($CaBr_2$), zinc chloride ($ZnCl_2$), zinc bromide ($ZnBr_2$), magnesium chloride ($MgCl_2$), magnesium bromide ($MgBr_2$), sodium hydrogen carbonite ($NaHCO_2$), potassium hydrogen carbonite ($KHCO_2$), cesium hydrogen carbonite ($CsHCO_2$), ammonium chloride ($NH_4Cl$), ammonium bromide ($NH_4Br$), sodium acetate ($NaO_2CCH_3$), potassium acetate ($KO_2CCH_3$), hydrates thereof, or any combinations thereof.

The brine in the treatment solution includes a concentration of salt in any amount or concentration such as unsaturated, saturated, supersaturated, and saturated with additional solids. For example, the salt can be in an amount of about 1 wt % to about 85 wt % relative to the total weight of the brine. The brine in the treatment solution has a concentration of salt from about 1 wt %, about 2 wt %, about 3 wt %, about 4 wt %, about 4.5 wt %, about 5 wt %, about 6 wt %, about 7 wt %, about 8 wt %, about 9 wt %, about 10 wt % to about 12 wt %, about 15 wt %, about 18 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or more, relative to the total weight of the brine. For example, the brine in the treatment solution has a concentration of salt from about 3 wt % to about 85 wt %, about 3 wt % to about 75 wt %, about 3 wt % to about 65 wt %, about 5 wt % to about 65 wt %, about 7 wt % to about 65 wt %, about 10 wt % to about 65 wt %, about 15 wt % to about 65 wt %, about 20 wt % to about 65 wt %, about 25 wt % to about 65 wt %, about 30 wt % to about 65 wt %, about 3 wt % to about 50 wt %, about 5 wt % to about 50 wt %, about 7 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, about 5 wt % to about 45 wt %, about 10 wt % to about 45 wt %, about 20 wt % to about 45 wt %, about 3 wt % to about 30 wt %, about 5 wt % to about 30 wt %, about 7 wt % to about 30 wt %, about 10 wt % to about 30 wt %, about 15 wt % to about 30 wt %, about 20 wt % to about 30 wt %, or about 25 wt % to about 30 wt % relative to the total weight of the brine.

In one or more embodiments, the cyclic orthoester is completely soluble or at least substantially soluble in the treatment solution that is an aqueous fluid or brine containing no organic solvent or emulsifier or only an insignificant amount of organic solvent or emulsifier. An "insignificant amount", as used herein, means 5 wt % or less, such as about 1 ppm, about 10 ppm, about 100 ppm, about 0.1 wt %, about 0.5 wt %, or about 1 wt % to about 2 wt %, about 3 wt %, about 4 wt %, or 5 wt %.

In other embodiments, the treatment solution can also include one or more co-solvents and/or emulsifiers, such as one or more organic solvents. Exemplary organic solvents that can be included in the treatment solution can be or include, but are not limited to, one or more alcohols (e.g., methanol, ethanol, propanol, isopropanol), glycols, polyols, glycol ethers, pyrrolidones, ketones, other polar solvents, or any combination thereof. Specific organic solvents that can be included in the treatment solution can be or include, but are not limited to, one or more methanol, ethanol, propanol, isopropanol, butanol, ethylene glycol, propylene glycol, glycerol, polyethylene glycol, pyrrolidone, 1-methyl-2-pyrrolidone, acetone, methyl ethyl ketone, tetrahydrofuran, or any combination thereof.

In one or more embodiments, the treatment solution contains about 2 vol %, about 3 vol %, about 5 vol %, about 8 vol %, about 10 vol %, about 12 vol %, about 15 vol %, about 20 vol %, about 25 vol %, or about 30 vol % to about 35 vol %, about 40 vol %, about 45 vol %, about 50 vol %, about 60 vol %, about 70 vol %, or about 80 vol % of the co-solvent, the emulsifier, or the organic solvent. For example, the treatment solution contains about 2 vol % to about 80 vol %, about 5 vol % to about 80 vol %, about 5 vol % to about 70 vol %, about 5 vol % to about 60 vol %, about 5 vol % to about 50 vol %, about 5 vol % to about 40 vol %, about 5 vol % to about 30 vol %, about 5 vol % to about 25 vol %, about 5 vol % to about 20 vol %, about 5 vol % to about 15 vol %, about 10 vol % to about 80 vol %, about 10 vol % to about 70 vol %, about 10 vol % to about 60 vol %, about 10 vol % to about 50 vol %, about 10 vol % to about 40 vol %, about 10 vol % to about 30 vol %, about 10 vol % to about 25 vol %, about 10 vol % to about 20 vol %, or about 10 vol % to about 15 vol % of the co-solvent, the emulsifier, or the organic solvent.

After placing the treatment solution containing the acid precursor (e.g., cyclic orthoester) into the subterranean formation or environment, an acid is produced from the cyclic orthoester and acidizing the subterranean formation (e.g., the near-wellbore and near-fracture zone areas) with the formed acid is initiated. The acid is typically formed at or near a filter cake within the subterranean formation or environment. The forming of the acid from the cyclic orthoester can include allowing the cyclic orthoester to remain under subterranean conditions surrounding the placed treatment solution for a sufficient time to form the acid from the cyclic orthoester. For example, for hydrolyzable acid precursors, forming the acid from the cyclic orthoester can include hydrolyzing the cyclic orthoester to form the acid. In one or more embodiments, the treatment solution can be a relatively neutral solution containing one or more cyclic orthoesters that are activated downhole to produce in situ the acid, reduce the pH of the treatment or other downhole fluid, dissolve plugs, filter cakes, or carbonate surfaces, and increase production of the formation, well, or other feature within the downhole environment.

The acidification or hydrolysis of the cyclic orthoester can be delayed or otherwise time controlled by including one or more alkaline agents or bases in the treatment fluid. For example, the treatment solution can include one or more alkaline agents or bases that raise the pH of the treatment solution. The basic pH value provides the treatment fluid the ability to neutralize acids that may be downhole while the treatment solution is positioned into the desired location. Exemplary alkaline agents can be or include, but are not limited to one or more of triethanolamine, lime, sodium hydroxide, ammonium hydroxide, potassium hydroxide, magnesium hydroxide, one or more metal alkali salts, or any combination thereof. The alkaline agent can be present in any suitable amount. A suitable amount of the alkaline agent can be present in an amount including, but not limited to, about 0.1 wt % to about 10 wt % or about 1% wt % to about 5 wt %, based on a total weight of the treatment solution.

In one or more embodiments, the treatment solution has a basic pH of greater than 7, such as about 7.5, about 8, about 8.5, about 9, or about 9.5 to about 10, about 10.5, about 11, about 11.5, about 12, about 12.5, about 13, about 13.5, or about 14. For example, the treatment solution has a pH of greater than 7 to about 14, about 7.5 to about 14, about 8 to about 14, about 9 to about 14, about 10 to about 14, about 11 to about 14, about 12 to about 14, about 7.5 to about 13, about 8 to about 13, about 9 to about 13, about 10 to about 13, about 11 to about 13, about 12 to about 13, about 7.5 to about 12, about 8 to about 12, about 9 to about 12, about 10 to about 12, or about 11 to about 12, In some embodiments, the acid precursor (e.g., cyclic orthoester) produces the acid in the downhole environment at a specified temperature. The temperature can be about 50° F., about 60° F., about 70° F., about 80° F., about 90° F., about 100° F., about 125° F., about 150° F., about 200° F., or about 250° F. to about 300° F., about 350° F., about 400° F., about 450° F., about 500° F., or greater. For example, the temperature can be about 80° F. to about 500° F., about 100° F. to about 500° F., about 125° F. to about 500° F., about 150° F. to about 500° F., about 175° F. to about 500° F., about 200° F. to about 500° F., about 200° F. to about 450° F., about 200° F. to about 400° F., about 250° F. to about 400° F., about 250° F. to about 350° F., about 275° F. to about 325° F., about 80° F. to about 400° F., about 80° F. to about 350° F., about 80° F. to about 300° F., about 80° F. to about 250° F., about 80° F. to about 200° F., or about 80° F. to about 150° F.

The forming of the acid from the cyclic orthoester can include allowing the cyclic orthoester to remain under subterranean conditions surrounding the placed treatment solution for a time of at least about 1 half-lives of a hydrolysis reaction of the cyclic orthoester under the subterranean conditions surrounding the placed treatment solution to form the acid from the cyclic orthoester, or for about 1, about 2, about 3, about 4, about 5, about 6, about 7, about 8, about 9, or about 10 half-lives to about 12, about 14, about 16, about 18, about 20, about 25, about 30, about 40, about 50, about 75, about 100, about 125, about 150, about 175, or about 200 half-lives of a hydrolysis reaction of the cyclic orthoester under the subterranean conditions surrounding the placed treatment solution to form the acid from the acid precursor.

In some embodiments, the acid is produced from the cyclic orthoester by allowing the cyclic orthoester to remain in place in the downhole environment for about 30 minutes, about 1 hour, about 2 hours, about 3 hours, about 4 hours, about 5 hours, about 6 hours, about 8 hours, about 10 hours, about 12 hours, or about 15 hours to about 18 hours, about 20 hours, about 1 day, about 1.5 days, about 2 days, about 2.5 days, about 3 days, about 4 days, about 5 days, about 7 days, about 10 days, about 15 days, or longer, after introducing the treatment solution into the downhole environment. For example, the acid is produced from the cyclic orthoester by allowing the cyclic orthoester to remain in place in the downhole environment for about 30 minutes to about 15 days, about 30 minutes to about 10 days, about 30 minutes to about 5 days, about 30 minutes to about 3 days, about 30 minutes to about 1 day, about 2 hours to about 15 days, about 4 hours to about 15 days, about 4 hours to about 10 days, about 4 hours to about 7 days, about 6 hours to about 10 days, about 6 hours to about 7 days, about 6 hours to about 5 days, about 6 hours to about 4 days, about 6 hours to about 3 days, about 6 hours to about 2.5 days, about 6 hours to about 2 days, about 6 hours to about 1.5 days, about 6 hours to about 1 day, about 6 hours to about 18 hours, about 6 hours to about 12 hours, about 12 hours to about 15 days, about 12 hours to about 10 days, about 12 hours to about 7 days, about 12 hours to about 5 days, about 12 hours to about 4 days, about 12 hours to about 3 days, about 12 hours to about 2.5 days, about 12 hours to about 2 days, about 12 hours to about 1.5 days, about 12 hours to about 1 day, or about 12 hours to about 18 hours after introducing the treatment solution into the downhole environment.

Synthesis of Cyclic Orthoesters

The cyclic orthoesters having the chemical formula of Formula I are synthesized from an orthoester and one or more glycols according to the Schematic I:

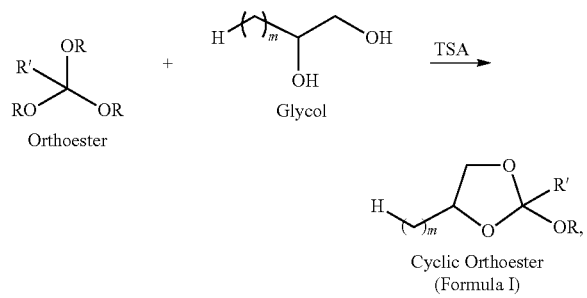

Cyclic Orthoester
(Formula I)

where R is a $C_1$-$C_{10}$ alkyl; R' is hydrogen or a $C_1$-$C_{10}$ alkyl; m is an integer in a range of 0 to 10, such as 0 to 5, and TSA is the organic solvent p-toluenesulfonic acid monohydrate. In one or more examples, R is methyl, ethyl, or propyl; R' is hydrogen, methyl, or ethyl; and m is an integer of 0, 1, or 2. The glycol can be or include, but is not limited to, ethylene glycol, 1,2-propylene glycol, 1,2-butanediol, 1,2-pentanediol, or any combination thereof. Although not represented by the above chemical formula for glycol, the glycol can also be or include, but is not limited to, glycerol, 1,3-propylene glycol, 1,3-butanediol, 1,3-pentanediol, or any combination thereof.

The cyclic orthoesters having the chemical formula of Formula IIa are synthesized from an orthoester and 1,3-glycol according to the Schematic IIa:

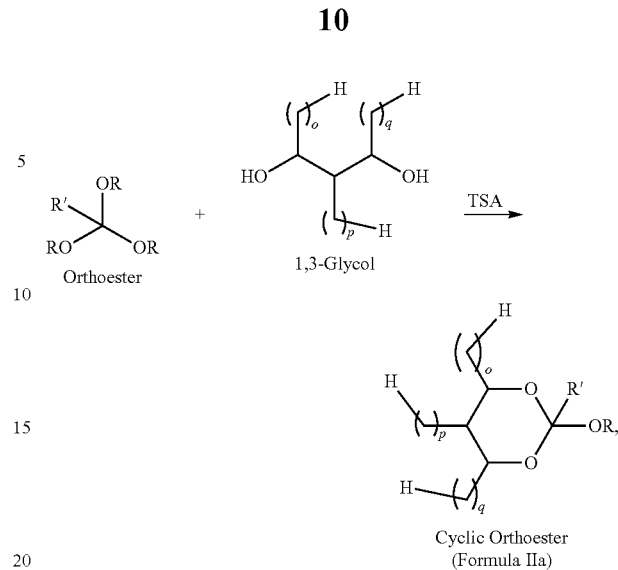

Cyclic Orthoester
(Formula IIa)

where R is a $C_1$-$C_{10}$ alkyl; R' is hydrogen or a $C_1$-$C_{10}$ alkyl; and each of o, p, and q is independently an integer in a range of 0 to 10, such as 0 to 5. In one or more examples, R is methyl, ethyl, or propyl; R' is hydrogen, methyl, or ethyl; and each o, p, and q is independently 0, 1, or 2.

For example, the cyclic orthoesters having the chemical formula of Formula IIb are synthesized from an orthoester and 1,3-propylene glycol according to the Schematic IIb:

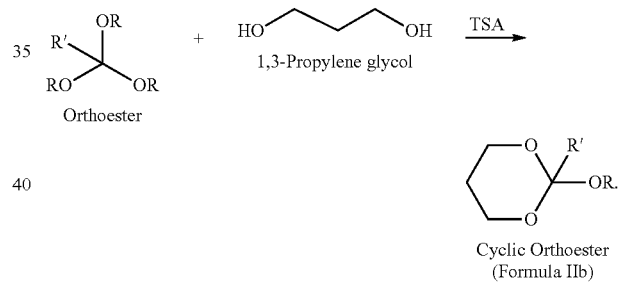

Cyclic Orthoester
(Formula IIb)

The mono(cyclic orthoesters) having Formula III and the di(cyclic orthoesters) having Formula IV are synthesized from the orthoesters having Formula I and one or more glycols according to the Schematic III:

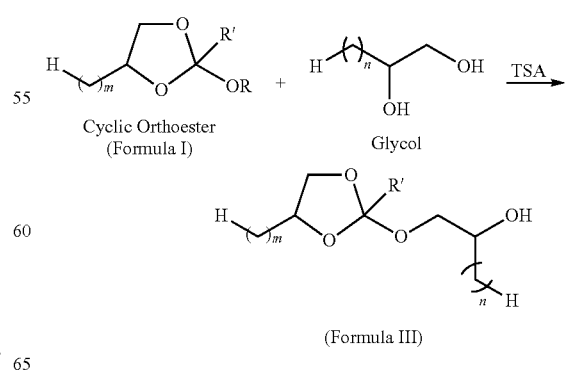

(Formula III)

+

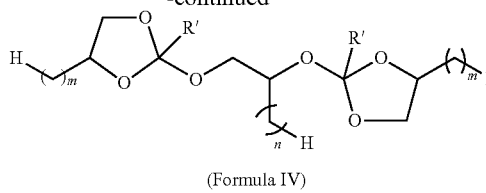

(Formula IV)

where R' is hydrogen or a $C_1$-$C_{10}$ alkyl; and each m and n is independently an integer in a range of 0 to 10, such as 0 to 5. In one or more examples, R' is hydrogen, methyl, or ethyl; and each m and n is independently an integer of 0, 1, or 2. The glycol can be or include, but is not limited to, ethylene glycol, 1,2-propylene glycol, 1,2-butanediol, 1,2-pentanediol, or any combination thereof.

The mono(cyclic orthoesters) having Formula Va and the di(cyclic orthoesters) having Formula VIa are synthesized from the orthoesters having Formula IIa and 1,3-glycol according to the Schematic IVa:

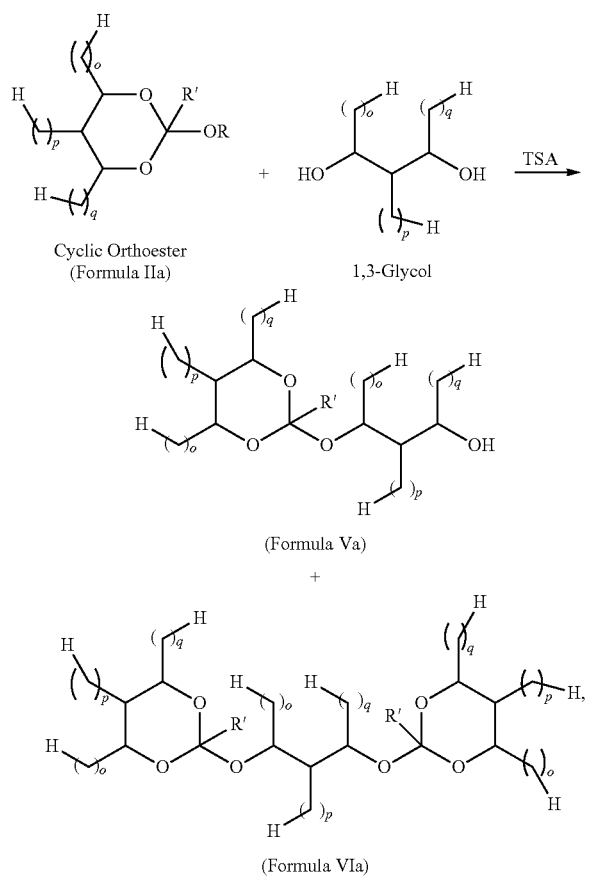

where R' is hydrogen or a $C_1$-$C_{10}$ alkyl; and each of o, p, and q is independently an integer in a range of 0 to 10, such as 0 to 5. In one or more examples, R' is hydrogen, methyl, or ethyl; and each o, p, and q is independently 0, 1, or 2.

In one or more examples, the mono(cyclic orthoesters) having Formula Vb and the di(cyclic orthoesters) having Formula VIb are synthesized from the orthoesters having Formula IIb and 1,3-propylene glycol according to the Schematic IVb:

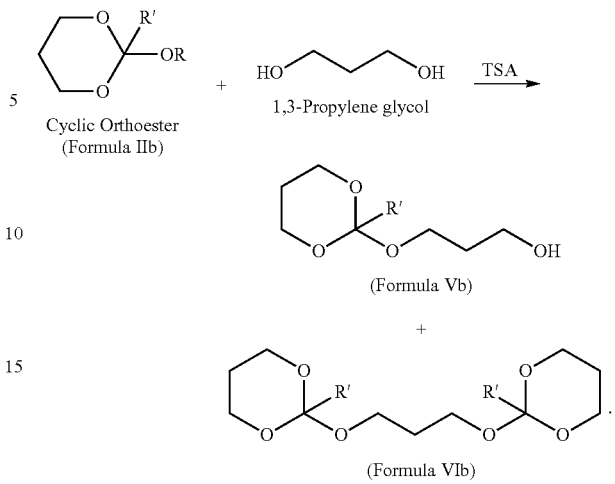

The cyclic orthoesters having Formula VII are mono (cyclic orthoesters), as well as multi(cyclic orthoesters) including di(cyclic orthoesters), tri(cyclic orthoesters), and larger cyclic orthoesters. The cyclic orthoesters having Formula VII are synthesized from one or more orthoesters and glycerol according to the Schematic V:

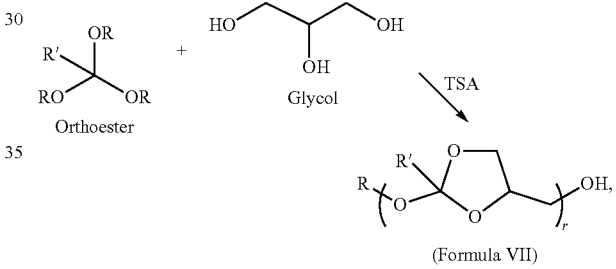

where R is a $C_1$-$C_{10}$ alkyl; R' is hydrogen or a $C_1$-$C_{10}$ alkyl; and r is an integer in a range of 1 to about 20. In one or more examples, R is methyl, ethyl, or propyl; R' is hydrogen, methyl, or ethyl; and r is an integer in a range of 2 to 10.

Formula VII is a chemical formula for one or more mono(cyclic orthoesters) when r is 1, one or more di(cyclic orthoesters) when r is 2, and/or one or more multi(cyclic orthoesters) when r is 3, 4, 5, 6, 7, 8, 9, 10, 11, 12, or greater. In one or more examples, r is 1 to 10.

Experimental Section

Synthesis of Mono- and Di-Cyclic Orthoesters—

A three-neck round-bottom flask (1,000 mL) is dried in the oven at about 105° C. overnight and cooled to room temperature (about 23° C.) under dry $N_2$ atmosphere. Ethylene glycol (EG, about 300 g, about 4.83 mol), trimethyl orthoformate (TMOF, about 353 mL, about 342 g, about 3.22 mol), and p-toluenesulfonic acid monohydrate (TSA, about 0.3 g, about 0.1 wt % based on EG) are added into the flask under $N_2$ environment. Methanol is produced within the mixture as a byproduct. A Vigreux column is attached to the flask and methanol is distilled out from the mixture starting at about 77° C. and by increasing temperature to the following approximate temperatures 80° C., 85° C., 90° C., 95° C., 100° C., 120° C., 140° C., 160° C., and 180° C. when methanol stops coming out of the column at each temperature. The reaction is continued at about 180° C. for additional time, such as about 30 minutes. Then the mixture is cooled down to room temperature (about 23° C.) under N₂ blanket. About 10 drops of triethylamine were added into the reaction mixture to neutralize excess TSA. The reaction solution is stirred under vacuum at room temperature (about 23° C.) for about 4 hours to remove volatile chemicals to give final product as a light-yellow liquid (about 299 g, about 46% yield).

Brine Solubility of Mono- and Di-Cyclic Orthoesters—

A series of orthoester samples were prepared with different amount of mono-orthoester (Formula III, R'=H and n, m=0) and di-orthoester (Formula IV, R'=H and n, m=0). Table 1 shows the solubility of these orthoesters in both about 9.6 lb/gal of NaCl and about 10 lb/gal of NaBr brines. As shown in the table, the solubility in the NaCl brine drops significantly when the di-orthoester concentration reaches about 27 wt % to about 30 wt %, and the orthoesters are more soluble in NaBr brine. Therefore, the solubility of the orthoester can be adjusted simply by controlling the amount of di-orthoester in the product.

TABLE 1

Brine solubility of cyclic orthoesters with different amount of mono-/di-cyclic orthoesters

| Cyclic Orthoester | Mono(cyclic orthoester) (wt %) | Di(cyclic orthoester) (wt %) | Solubility (%, v/v) @ RT | |
|---|---|---|---|---|
| | | | 9.6 lb/gal NaCl | 10.0 lb/gal NaBr |
| Mono(cyclic orthoester) | 100 | 0 | >40 | >40 |
| Di(cyclic orthoester) | 0 | 100 | <5 | 18 |
| Sample #1 | 50.0 | 26.4 | >40 | >40 |
| Sample #2 | 50.9 | 28.5 | 30 | >40 |
| Sample #3 | 51.7 | 31.1 | 20 | >40 |
| Sample #4 | 44.4 | 47.5 | <7 | >32 |
| Sample #5 | 31.5 | 65.2 | <5 | 25 |
| Sample #6 | 13.2 | 86.5 | <5 | 18 |

In addition to the embodiments described above, embodiments of the present disclosure further relate to one or more of the following paragraphs:

1. A method for treating a downhole environment, comprising: introducing a treatment solution into a wellbore within the downhole environment, wherein the treatment solution comprises: a cyclic orthoester; and a brine comprising water and about 5 wt % to about 65 wt % of a salt; and hydrolyzing the cyclic orthoester to produce an acid within the downhole environment.

2. A method for treating a downhole environment, comprising: introducing a treatment solution into a wellbore within the downhole environment, wherein the treatment solution comprises: a cyclic orthoester; a brine comprising water and about 5 wt % to about 65 wt % of a salt; and an organic solvent; and hydrolyzing the cyclic orthoester to produce an acid within the downhole environment.

3. The method of paragraph 1 or 2, wherein the cyclic orthoester has at least one of the formulas:

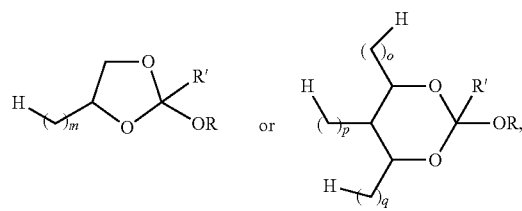

wherein: R is methyl, ethyl, or propyl; R' is hydrogen, methyl, or ethyl; m is an integer of 0, 1, or 2; and each of o, p, and q is independently an integer of 0, 1, 2, 3, or 4.

4. The method according to any one of paragraphs 1-3, wherein the cyclic orthoester has the formulas:

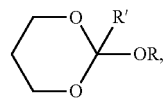

wherein: R is methyl, ethyl, or propyl; and R' is hydrogen, methyl, or ethyl.

5. The method according to any one of paragraphs 1-4, wherein the cyclic orthoester has at least one of the formulas:

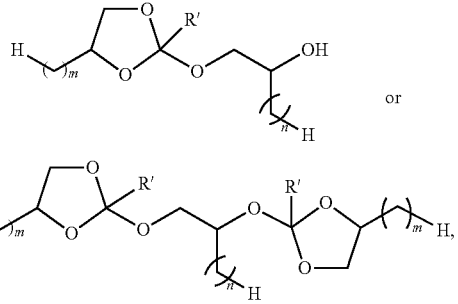

wherein: R' is hydrogen, methyl, or ethyl; and each m and n is independently an integer of 0, 1, or 2.

6. The method according to any one of paragraphs 1-5, wherein the cyclic orthoester has at least one of the formulas:

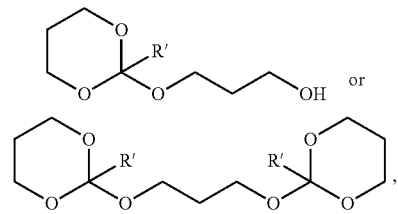

wherein: R' is hydrogen, methyl, or ethyl.

7. The method according to any one of paragraphs 1-6, wherein the cyclic orthoester has at least one of the formulas:

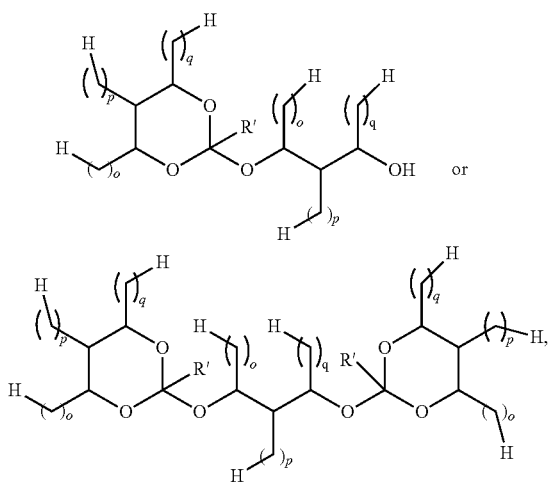

wherein: R' is hydrogen, methyl, or ethyl; and each of o, p, and q is independently an integer of 0, 1, 2, 3, or 4.

8. The method according to any one of paragraphs 1-7, wherein the cyclic orthoester has the chemical formula:

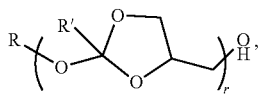

wherein: R is methyl, ethyl, or propyl; R' is hydrogen, methyl, or ethyl; and r is an integer in a range of 1 to 10.

9. The method according to any one of paragraphs 1-8, wherein the cyclic orthoester comprises a multi(cyclic orthoester) comprising two or more cyclic orthoester groups.

10. The method according to any one of paragraphs 1-9, wherein the treatment solution comprises about 10 vol % to about 50 vol % of the cyclic orthoester.

11. The method according to any one of paragraphs 1-10, wherein the treatment solution further comprises an organic solvent.

12. The method of paragraph 11, wherein the treatment solution comprises about 5 vol % to about 50 vol % of the organic solvent.

13. The method according to any one of paragraphs 1-12, wherein the brine comprises about 5 wt % to about 45 wt % of the salt.

14. The method according to any one of paragraphs 1-13, wherein the salt comprises three or more salts selected from the group consisting of sodium chloride, sodium bromide, potassium chloride, potassium bromide, calcium chloride, calcium bromide, zinc chloride, zinc bromide, magnesium chloride, magnesium bromide, and any combination thereof.

15. The method according to any one of paragraphs 1-14, wherein the treatment solution comprises an alkaline agent.

16. The method of paragraph 15, wherein the cyclic orthoester is hydrolyzed to produce the acid within the downhole environment at about 30 minutes to about 3 days after introducing the treatment solution into the wellbore.

17. A composition for treating a downhole environment, comprising the treatment fluid described in any one of paragraphs 1-16.

18. A composition for treating a downhole environment, comprising: a brine comprising water and about 5 wt % to about 65 wt % of a salt; and a cyclic orthoester having at least one of the formulas:

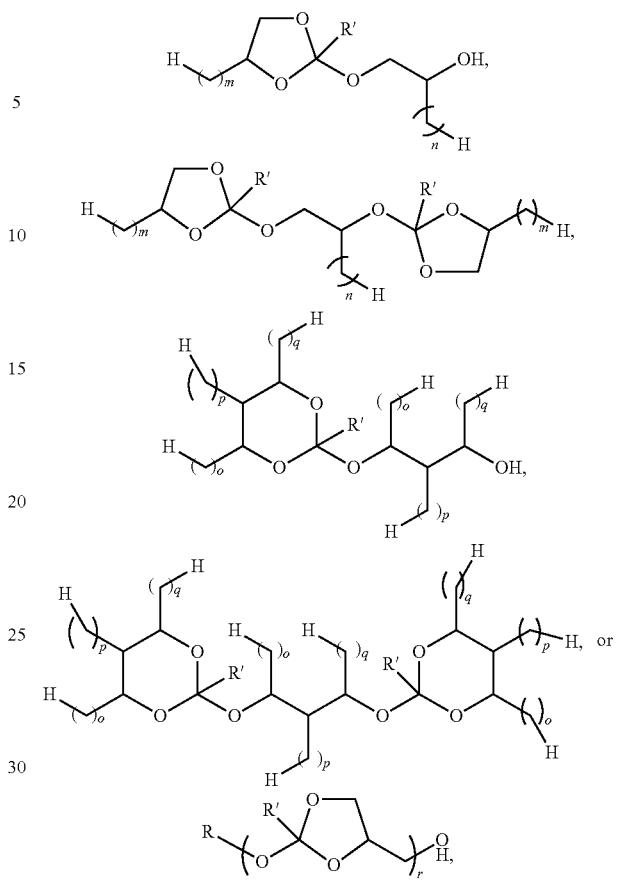

wherein: R is methyl, ethyl, or propyl; R' is hydrogen, methyl, or ethyl; each m and n is independently an integer of 0, 1, or 2; r is an integer in a range of 1 to 10; and each of o, p, and q is independently an integer of 0, 1, 2, 3, or 4.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . " Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases, or similar language throughout this specification may, but do not necessarily, all refer to the same embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for treating a downhole environment, comprising:
    introducing a treatment solution into a wellbore within the downhole environment,
        wherein the treatment solution comprises:
            a cyclic orthoester; and
            a brine comprising water and about 5 wt % to about 65 wt % of a salt;
    hydrolyzing the cyclic orthoester to produce an acid within the downhole environment; and
    acidizing the downhole environment with the acid.

2. The method of claim 1, wherein the cyclic orthoester has at least one of the formulas:

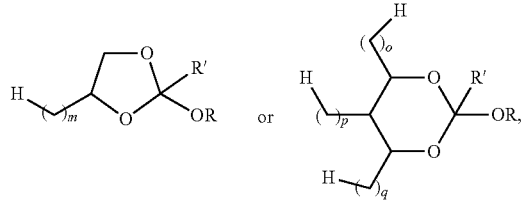

wherein:
    R is methyl, ethyl, or propyl;
    R' is hydrogen, methyl, or ethyl;
    m is an integer of 0, 1, or 2; and
    each of o, p, and q is independently an integer of 0, 1, 2, 3, or 4.

3. The method of claim 1, wherein the cyclic orthoester has at least one of the formulas:

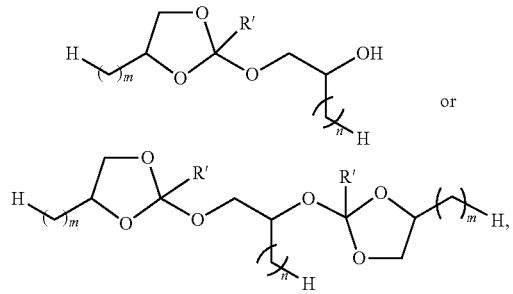

wherein:
    R' is hydrogen, methyl, or ethyl; and
    each m and n is independently an integer of 0, 1, or 2.

4. The method of claim 1, wherein the cyclic orthoester has at least one of the formulas:

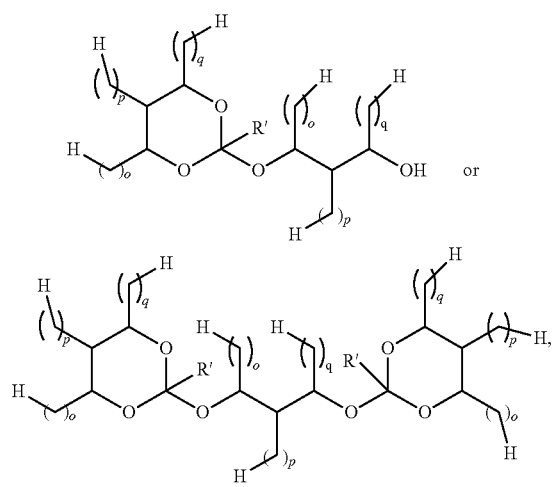

wherein:
    R' is hydrogen, methyl, or ethyl; and
    each of o, p, and q is independently an integer of 0, 1, 2, 3, or 4.

5. The method of claim 1, wherein the cyclic orthoester has the chemical formula:

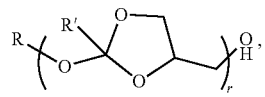

wherein:
    R is methyl, ethyl, or propyl;
    R' is hydrogen, methyl, or ethyl; and
    r is an integer in a range of 1 to 10.

6. The method of claim 1, wherein the cyclic orthoester comprises a multi(cyclic orthoester) comprising two or more cyclic orthoester groups.

7. The method of claim 1, wherein the treatment solution comprises about 10 vol % to about 50 vol % of the cyclic orthoester.

8. The method of claim 1, wherein the treatment solution further comprises an organic solvent.

9. The method of claim 8, wherein the treatment solution comprises about 5 vol % to about 50 vol % of the organic solvent.

10. The method of claim 1, wherein the brine comprises about 5 wt % to about 45 wt % of the salt, and wherein the salt comprises three or more salts selected from the group consisting of sodium chloride, sodium bromide, potassium chloride, potassium bromide, calcium chloride, calcium bromide, zinc chloride, zinc bromide, magnesium chloride, magnesium bromide, and any combination thereof.

11. The method of claim 1, wherein the treatment solution comprises an alkaline agent.

12. The method of claim 11, wherein the cyclic orthoester is hydrolyzed to produce the acid within the downhole environment at about 30 minutes to about 3 days after introducing the treatment solution into the wellbore.

13. A method for treating a downhole environment, comprising:
    introducing a treatment solution into a wellbore within the downhole environment, wherein
        the treatment solution comprises:
            a cyclic orthoester;
            a brine comprising water and about 5 wt % to about 65 wt % of a salt; and
            an organic solvent;
    hydrolyzing the cyclic orthoester to produce an acid within the downhole environment; and
    acidizing the downhole environment with the acid.

14. The method of claim 13, wherein the cyclic orthoester has at least one of the formulas:

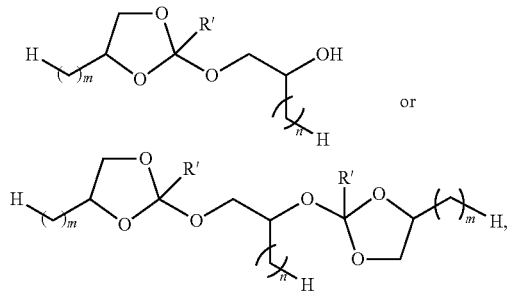

wherein:
    R' is hydrogen, methyl, or ethyl; and
    each m and n is independently an integer of 0, 1, or 2.

15. The method of claim 13, wherein the cyclic orthoester has at least one of the formulas:

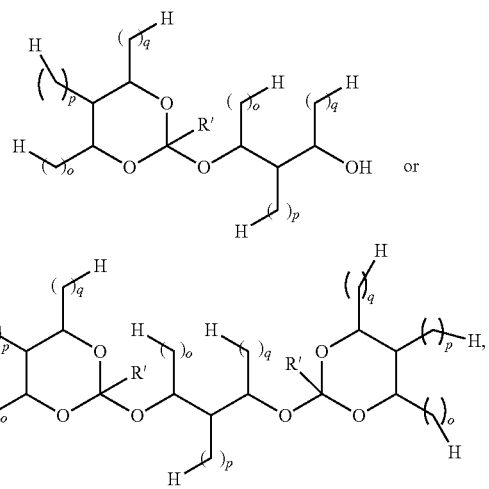

wherein:
    R' is hydrogen, methyl, or ethyl; and
    each of o, p, and q is independently an integer of 0, 1, 2, 3, or 4.

16. The method of claim 13, wherein the cyclic orthoester has the chemical formula:

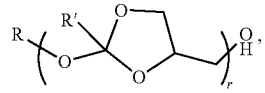

wherein:
    R is methyl, ethyl, or propyl;
    R' is hydrogen, methyl, or ethyl; and
    r is an integer in a range of 1 to 10.

17. The method of claim 13, wherein the cyclic orthoester comprises a multi(cyclic orthoester) comprising two or more cyclic orthoester groups.

18. The method of claim 13, wherein the treatment solution comprises about 10 vol % to about 50 vol % of the cyclic orthoester, and wherein the treatment solution comprises about 5 vol % to about 50 vol % of the organic solvent.

19. The method of claim 13, wherein the treatment solution comprises an alkaline agent, and wherein the cyclic orthoester is hydrolyzed to produce the acid within the downhole environment at about 30 minutes to about 3 days after introducing the treatment solution into the wellbore.

* * * * *